United States Patent [19]

Gregory

[11] 4,330,681
[45] May 18, 1982

[54] FLUID-FILLED ELECTRIC CABLE JOINTS AND TERMINATIONS WITH FILTERING MEANS

[75] Inventor: Brian Gregory, Dartford, England

[73] Assignee: BICC Limited, London, England

[21] Appl. No.: 178,790

[22] Filed: Aug. 18, 1980

[51] Int. Cl.³ .................... H02G 15/22; H02G 15/24
[52] U.S. Cl. .................................. 174/14 R; 174/19; 174/21 R; 174/22 R
[58] Field of Search .................. 174/14 R, 14 BH, 19, 174/20, 21 R, 21 C, 22 R, 22 C

[56] References Cited

U.S. PATENT DOCUMENTS

| | | | |
|---|---|---|---|
| 1,979,150 | 10/1934 | Emanueli | 174/21 R X |
| 2,161,413 | 6/1939 | Gooding et al. | 174/21 R |
| 2,222,718 | 11/1940 | Phillips | 174/22 R |
| 2,356,614 | 8/1944 | Proos | 174/21 R |
| 2,406,676 | 8/1946 | Gambitta | 174/21 R |

FOREIGN PATENT DOCUMENTS

| | | | |
|---|---|---|---|
| 1159204 | 7/1969 | United Kingdom | 174/22 R |
| 1365921 | 9/1974 | United Kingdom | 174/21 R |

*Primary Examiner*—Laramie E. Askin
*Attorney, Agent, or Firm*—Buell, Blenko, Ziesenheim & Beck

[57] ABSTRACT

Risk that metal particles carried by flowing oil in an oil-filled cable joint or termination will settle along an oil path between a cable conductor and the space bounded by the joint or termination enclosure is substantially reduced by making at least part, and preferably the whole, of the boundary wall of the path of a fibrous insulating material, e.g., paper, and by providing, at at least one end of the path, for filtering from flowing oil particles of metal and other undesirable materials that may be carried by the oil, filtering means comprising, in combination, electrically insulating filtering material and a fine metallic mesh, serving as an electrical screen. Fibres of the boundary wall so formed protrude into the path and restrict mobility of metal particles carried by the flowing oil; some metal particles will penetrate the fibrous insulating material which will also absorb from the oil some types of dissolved contamination, e.g., moisture. The oil path may extend through a body of fibrous insulating material built up around the conductor joint or termination or, over at least a part of its length, it may be formed between such a body of fibrous insulating material and a preformed body of cast resin.

19 Claims, 13 Drawing Figures

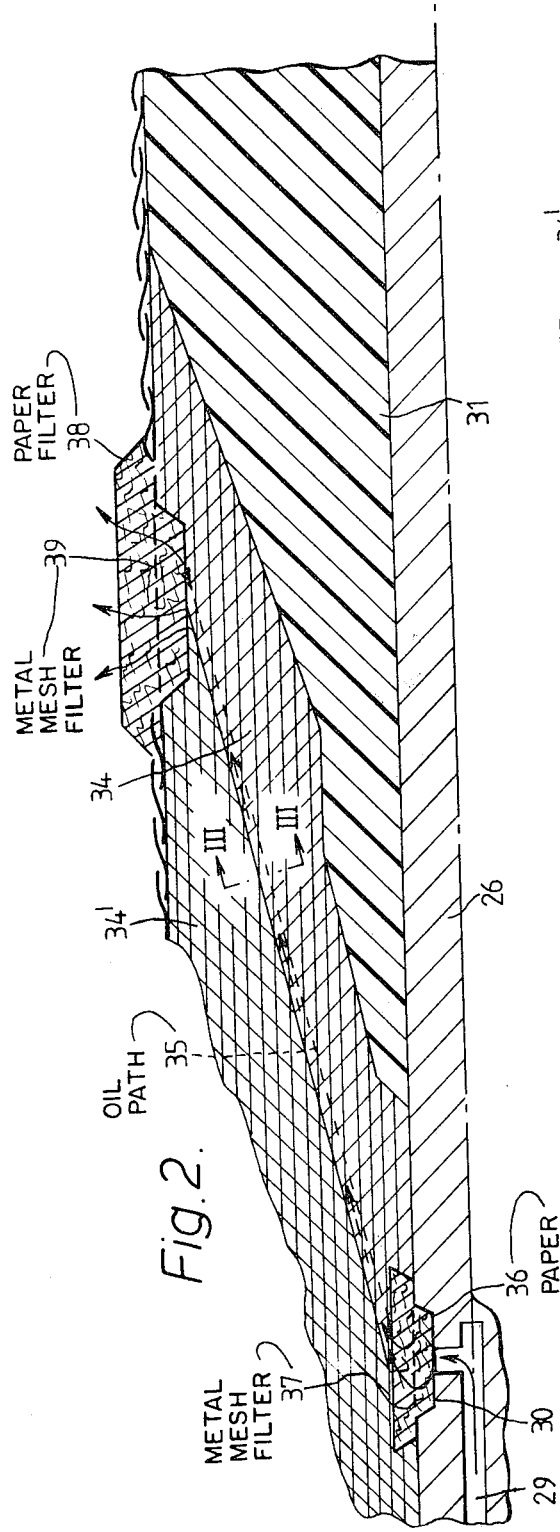

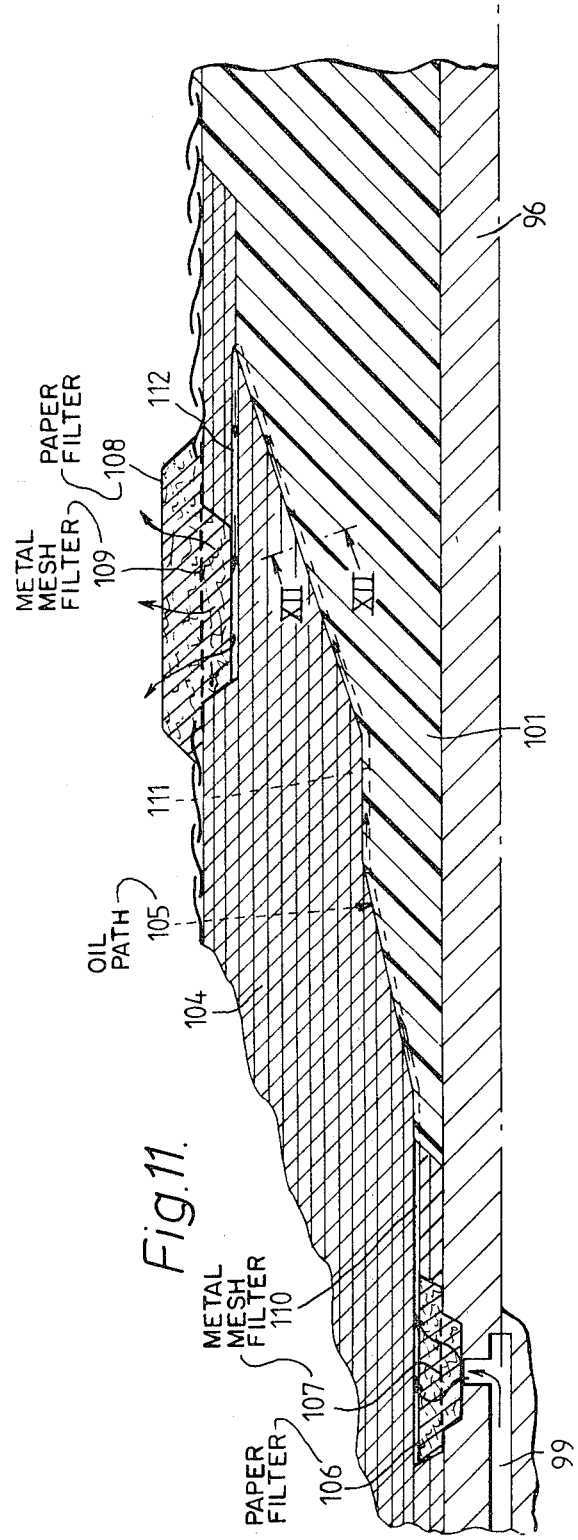

FLUID-FILLED ELECTRIC CABLE JOINTS AND TERMINATIONS WITH FILTERING MEANS

This invention relates to joints and terminations for fluid-filled electric cables, that is to say cables in which the dielectric of the or each cable conductor connected or terminated at the joint or termination includes a dielectric fluid, usually oil, which is free to flow along the cable conductor or conductors. The insulation of the or each cable conductor is a laminated body built up by lapping tapes of paper or other insulating material onto the cable conductor.

The invention is particularly concerned with joints and terminations of the kind in which a path or paths is or are provided for free flow of the dielectric fluid from the or each cable conductor into the space bounded by the joint or termination enclosure or vice versa, for example straight feed joints, stop joints and terminations for oil-filled cables in which the oil serves as part of the dielectric of the cable. In some applications in joints and terminations of this kind the oil also serves as a cooling medium, the oil circulating through the cable conductor or conductors and through external cooling means. A stop joint is a joint which presents a barrier to the flow of the dielectric fluid from one to the other of the two cable lengths electrically connected at the joint. The invention includes joint and termination structures of the aforesaid kind and cable installations incorporating joints and terminations made therefrom.

The invention is mainly concerned with joints between and terminations of single core fluid-filled cables and will be described as applied to such joints and terminations.

Especially, but not exclusively, the invention relates to stop joints in which the barrier to the flow of the dielectric fluid comprises an elongate metal member, by which the conductors of the two cables are both electrically and mechanically connected, and a preformed body of insulating material which surrounds at least part of and is directly or indirectly sealed to the metal member and to a fluid-tight enclosure for the joint. The elongate metal member may be a solid or hollow rod extending between and connected to two ferrules into each of which one of the conductors fits or it may itself be a ferrule, into each end of which one of the conductors fits, the metal member being provided with a central barrier to prevent dielectric fluid flowing from one conductor to the other. The preformed body of insulating material surrounding the metal member may for example be vacuum cast from an epoxy resin and it may be sealed directly to the metal member or to another body surrounding and sealed to the metal member. In practice, the or each path for free flow of dielectric fluid between a cable conductor, or the elongate metal member electrically and mechanically connected thereto, and the space bounded by the joint enclosure usually comprises either a port extending through the preformed body of insulating material or ports formed between the preformed body and two additional preformed bodies of insulating material positioned at opposite ends of the preformed body.

The or each path for free flow of dielectric fluid must not be less than a minimum width to permit unimpeded flow of dielectric fluid and must not be greater than a maximum width for electric strength; the dimensional limits placed on the or each path necessitates a high degree of skill and care in the manufacture of the preformed body or bodies and such manufacture can be expensive. Furthermore, there is a risk that particles of metal or other materials inadvertantly produced during cable manufacture and jointing and carried by the flowing dielectric fluid to a joint or termination might settle along a path between a cable conductor or elongate metal member, which is at the operating voltage of the cable installation, and the space bounded by the joint or termination enclosure, which enclosure is at earth or low potential, and that the metal particles will initiate electric distress by contacting each other and producing an electric discharge or will become aligned and produce electric breakdown of the adjacent conductor insulation due to excessive electric stress at the tips of the aligned particles.

The present invention provides a joint or termination for fluid-filled electric cables which is cheaper than fluid-filled cable joints or terminations hitherto proposed and used and which is of such a construction that the aforesaid risks are substantially reduced.

In the joint or termination in accordance with the present invention the or each path for flow of dielectric fluid between a cable conductor, or the elongate metal member electrically and mechanically connected thereto, and the space bounded by the joint or termination enclosure is defined by a boundary wall of which at least a part, extending between the cable conductor or the elongate metal member and said space, is of a fibrous insulating material, and, there is provided at at least one end of each said path, for filtering from flowing dielectric fluid particles of metal and other undesirable materials that may be carried by the fluid, filtering means comprising, in combination, electrically insulating filtering material and a fine metallic mesh, serving as an electrical screen.

Where the dielectric fluid is an insulating oil, the electrically insulating filtering material of the filtering means may be any one of paper, glass fibres or woven filter fabric such as ptfe. Preferably, the filtering means is a paper filter in which is incorporated a fine metallic mesh.

Preferably, substantially the whole of the boundary wall of the or each path, extending between the cable conductor or elongate metal member and the space bounded by the joint or termination enclosure, is made of a fibrous insulating material, e.g., paper.

Where the cable joint or termination is a stop joint in which the barrier to flow of the dielectric fluid comprises an elongate metal member, by which the conductors of the two cables of the joint are both electrically and mechanically connected, and a preformed body of insulating material which surrounds at least part of and is directly or indirectly sealed to the metal member and to the joint enclosure, preferably bodies of fibrous insulating material are provided at opposite ends of the preformed body and, at each end of the preformed body, the or each path for free flow of dielectric fluid between the cable conductor, or elongate metal member, and the space bounded by the joint enclosure either extends through the body of fibrous insulating material or, over at least a part of its length, is formed between the body of fibrous insulating material and the preformed body.

The or each path extending through a body of fibrous insulating material built up around the conductor joint or termination may be a passage formed in the body as the body is built up of lappings of paper tape and may, if desired, follow a zig-zag course through the body over at least a part of its length. Alternatively, the or each path in a body of fibrous insulating material built up around the conductor joint or termination may be a portion of the body which extends throughout the radial thickness and which is arranged to be of a low hydraulic impedance, e.g., by forming this portion of layers of helically lapped paper tapes, said tapes having gaps between adjacent turns and adjacent layers being of opposite hand, or by forming this portion of the body of a fibrous insulating material of a higher porosity than the material of the remainder of the body. As a further alternative, the whole of a body of fibrous insulating material built up around the conductor joint or termination may be of a fibrous insulating material of a substantially higher porosity than the insulating material of the conductor dielectric so that the body itself has a low hydraulic impedance. Where the body of fibrous insulating material as a whole is to constitute the path for flow of dielectric fluid between the cable conductor and the space bounded by the joint or termination enclosure, the body may comprise layers of helically lapped tapes of fibrous insulating material, said layers having gaps between adjacent turns and adjacent layers being of opposite hand. In yet another alternative arrangement, the or each path may be formed in a body of fibrous insulating material after the body has been formed and before or after it has been applied to the cable conductor, e.g., by drilling and cutting a passage through the radial thickness of the body.

Where the or each path, over at least a part of its length, is formed between the body of fibrous insulating material and the preformed body, the surface of the preformed body against which the body of fibrous insulating material abuts or, where the body of fibrous insulating material is preformed, the surface of the body of fibrous insulating material which will abut the preformed body, may have a groove cut in the surface to form said path, or where the body of fibrous insulating material is built up in situ, a preformed spacer may be positioned between the preformed body and the body of fibrous insulating material as it is being built up to form said path.

In all cases the end of the path opening into the space bounded by the joint or termination enclosure may be in a low or zero electrical stress area of the joint or termination. In addition to the fact that a fluid-filled cable joint or termination of the present invention is substantially cheaper than fluid-filled cable joints and terminations otherwise proposed and used, other important advantages arise from the fact that the or each path for flow of dielectric fluid between a cable conductor and the space bounded by the joint or termination enclosure has a boundary wall which defines the path and of which at least a part extending between the cable conductor and the space is of a fibrous insulating material:

1. Fibres of the fibrous insulating material protrude into the path and restrict the mobility of any particles being carried by the flowing dielectric fluid, thereby reducing the risk of contact between and alignment of metal particles;

2. some particles will penetrate the fibrous insulating material, thereby reducing the risk of a concentration of particles building up on the boundary wall of the path;

3. the fibrous insulating material will absorb from the dielectric fluid some types of dissolved contamination e.g., moisture;

4. the fibrous insulating material has a high resistance to electrical discharge; and 5. the or each path has a greater permissible dimensional tolerance.

The invention is further illustrated by a description, by way of example, of several forms of oil filled cable stop joint with reference to the accompanying drawings, in which:

FIG. 2 is a fragmental sectional side elevation of a second form of oil filled cable stop joint in which oil paths between a metal rod interconnecting the cable conductors and the space bounded by the joint enclosure are each defined by a boundary wall of paper;

FIGS. 3 to 5 are fragmental cross-sectional views, taken on the line III—III, of alternative forms of the oil path shown in FIG. 2;

Figure 8:
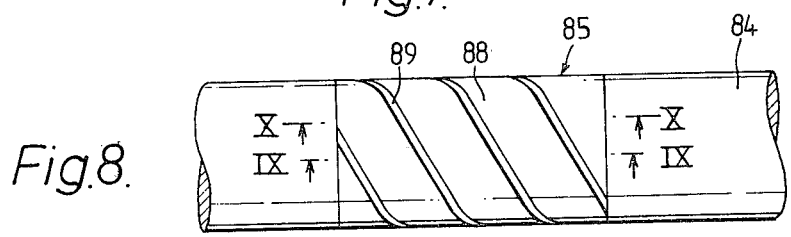
FIG. 8 is a fragmental plan view of an oil filled cable stop joint in which oil paths between a metal rod interconnecting the cable conductors and the space bounded by the joint enclosure are each built up by lapping paper tapes with gaps between adjacent turns and with adjacent layers of opposite hand.
Figure 9:
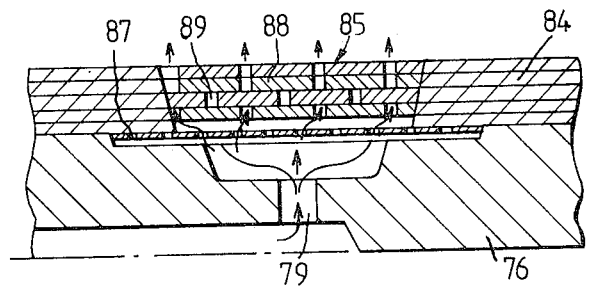
Figure 10:
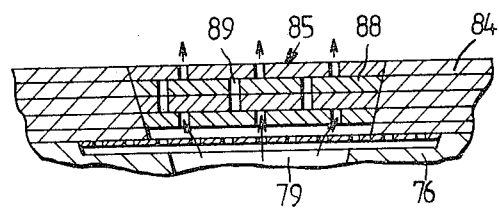

FIGS. 9 and 10, respectively, are fragmental cross-sectional views taken on the lines IX—IX and X—X in FIG. 8;

FIG. 11 is a fragmental sectional side elevation of an oil filled cable stop joint in which oil paths between a metal rod interconnecting the cable conductors and the space bounded by the joint enclosure are each defined in part by a central preformed body of cast resin and in part by paper;

FIG. 12 is a fragmental cross-sectional view, taken on the line XII—XII, in FIG. 11; and FIG. 13 is a similar fragmental cross-sectional view of an alternative form of oil path for the stop joint shown in FIG. 11.

Figure 1:
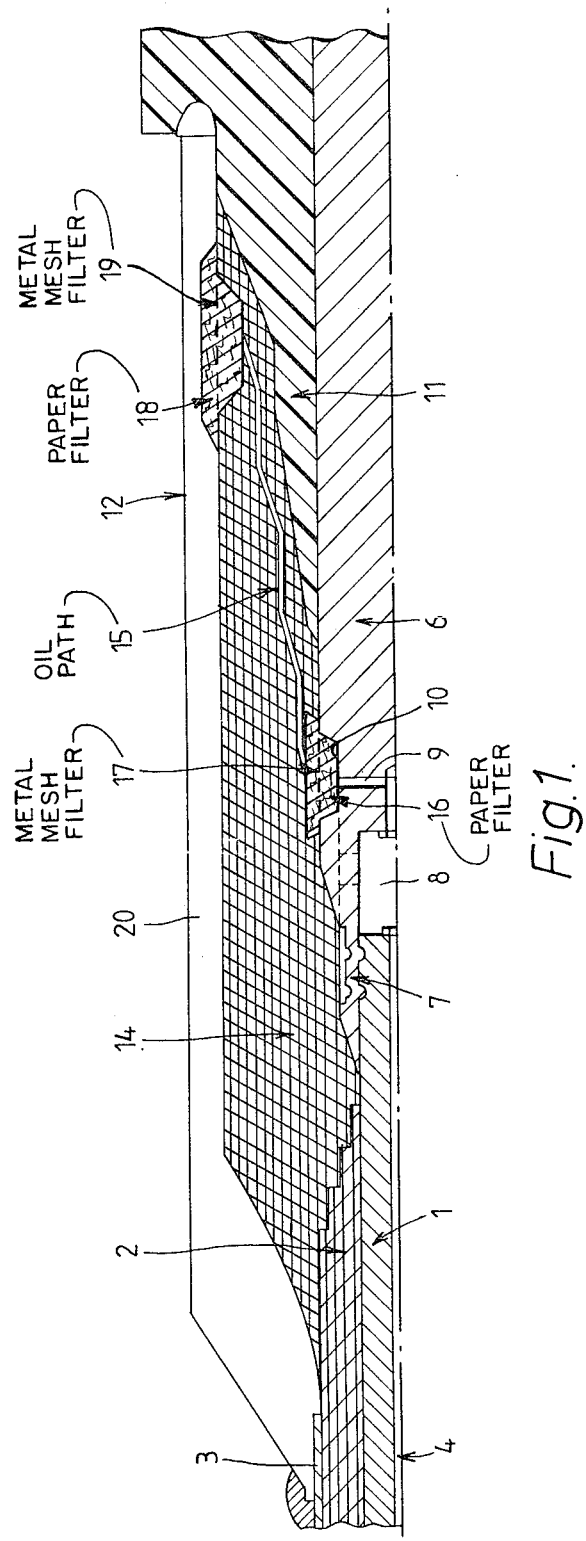
FIG. 1 is a fragmental sectional side elevation of an oil filled cable stop joint in which oil paths between a metal rod interconnecting the cable conductors and the space bounded by the joint enclosure are each defined by a boundary wall of paper.

In the stop joint shown in FIG. 1, the two oil filled electric cables connected at the joint each comprise a central hollow conductor 1, a surrounding body 2 of insulation and a cable sheath 3. The barrier to the flow of oil between the conductors 1 of the cables (only one conductor being shown) comprises a metal rod 6, which has at each of its ends a ferrule 7 into which one of the conductors is compression jointed, and a preformed central body 11 of cast epoxy resin which surrounds a part of the metal rod and is sealed to the metal rod and to the surrounding joint enclosure 12. At each end of the joint, the joint enclosure 12 is sealed to the cable sheath 3. Each cable conductor 1 has a central oil duct 4 which opens into a space 8 bounded by the ferrule 7 into which the conductor is compression jointed and, at each end of the metal rod 6, a port 9 extends from the space 8 into a recess 10 in the outer surface of the rod. At each end of the joint, a built up body 14 of helically lapped paper tapes extends over a part of the central body 11 of cast epoxy resin, over the exposed parts of the metal rod 6 and conductor 1 and over the conductor insulation 2. An oil path 15 extends through the paper body 14 from the recess 10 in the metal rod 6 to the space 20 bounded by the joint enclosure 12, the oil path thereby being defined throughout its length by a boundary wall of paper. At the inner end of the oil path 15 and housed in the recess 10 is a paper filter 16 in which is incorporated a metal mesh filter 17 constituting an electrical screen. At the outer end of the oil path 15 is another paper filter 18 incorporating a metal mesh filter 19 constituting an electrical screen. In the stop joint shown in FIG. 2, features corresponding to the features of the stop joint shown in FIG. 1 are given references twenty greater than the references of the corresponding features in FIG. 1. At each end of the stop joint shown in FIG. 2, two preformed bodies 34, 34' of paper insulating material extend over a part of the central body 31 of cast epoxy resin, over the exposed parts of the metal rod 26 and cable conductor, and over the conductor insulation. One or each of the abutting surfaces of the two preformed bodies 34, 34' is so shaped as to form between the two bodies an oil path 35 extending from the port 29 in the metal rod 26 to the spaced bounded by the joint enclosure (not shown). In the recess 30 in the outer surface of the metal rod 26 at the inner end of the oil path 35 is a paper filter 36 in which is incorporated a metal mesh filter 37 constituting an electrical screen. At the outer end of the oil path 35 is a paper filter 38 incorporating a metal mesh filter 39 which also constitutes an electrical screen.

Three forms of the oil path 35 of the stop joint shown in FIG. 2 are illustrated in FIGS. 3 to 5. In FIG. 3, the inner preformed body 34 has in its outermost surface a groove 41 and, when the outer preformed body 34' overlies the preformed body 34, the groove 41 constitutes the oil path 35. In FIG. 4, the inner preformed body 34 has in its outer surface a groove 42 in which is housed a tube 43 which constitutes the oil path 35. In FIG. 5, the inner preformed body 34 has in its outer surface a groove 44 and, before the outer preformed body 34' is applied over the inner preformed body, a sheet 45 of corrugated paper is inserted in the groove 44 and serves as an additional filtering element in the oil path 35.

Figure 6:
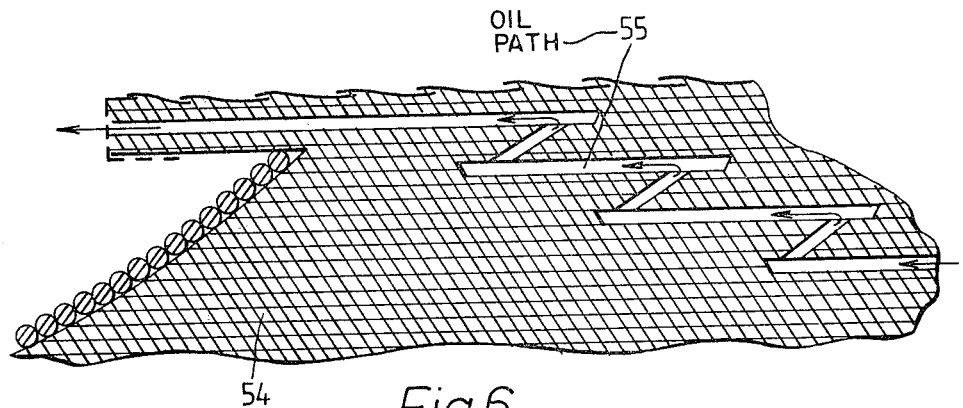
FIG. 6 is a fragmental sectional side elevation of an oil filled cable stop joint in which oil paths between a metal rod interconnecting the cable conductors and the space bounded by the joint enclosure each follows a zig-zag course and opens into the space bounded by the joint enclosure in a low or zero electrical stress area of the joint.

In the oil filled cable stop joint shown in FIG. 6, at each end of the joint the insulating body 54 is built up of lapped paper tapes and, during building up of the body, an oil passage 55 is formed which follows a zig-zag course and which opens into the spaced bounded by the joint enclosure at one end of the joint in a low or zero electrical stress area of the joint.

Figure 7:
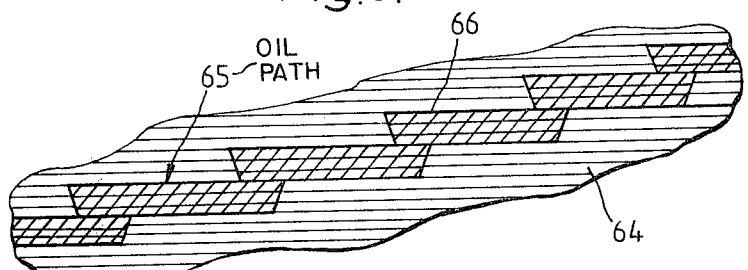
FIG. 7 is a fragmental sectional side elevation of an oil filled cable stop joint in which each oil path is built up of layers of paper of lower impermeability than the paper of the remainder of the paper body.

In the oil filled cable stop joint shown in FIG. 7, at each end of the joint the insulating body 64 of helically lapped paper tapes is made up in part of paper tapes 66 of a paper of higher porosity than the paper of the remaining tapes of the body. The paper tapes 66 are so applied as to form an oil passage 65 extending between the metal rod interconnecting the cable conductors and the joint enclosure.

In the oil filled cable stop joint shown in FIGS. 8 to 10, at each end of the joint an oil path 85 extends between the metal rod 76 interconnecting the cable conductors and the space bounded by the joint enclosure. The oil path 85 is formed during build up of the insulating body 84 of helically lapped paper tapes by helically lapping some of the paper tapes 88 with gaps 89 between adjacent turns and with adjacent layers of helically lapped paper tapes of opposite hand. A metal mesh filter 87 is provided at the inner end of the oil path 85; a similar metal mesh filter may be provided at the outer end of the oil path 85.

It will be appreciated that in all the oil filled electric cable stop joints described with reference to FIGS. 1 to 10, each oil path extending between the metal rod interconnecting the cable conductors and the space bounded by the joint enclosure is defined by a boundary wall made wholly of paper.

FIGS. 11 and 12 illustrate an oil filled cable stop joint in which, at each end of the joint, an oil path, which, extends between a metal rod 96 interconnecting the cable conductors and the space bounded by the joint enclosure, is defined in part by a central preformed body 101 of cast epoxy resin and in part by paper. The preformed body 101 has in its outer surface a groove 114 and, when a body 104 of helically lapped paper tapes is built up over the preformed body 101 and over the adjacent exposed portion of the metal rod 96, an intermediate part 111 of the oil path 105 is formed between the preformed body 101 and the paper body 104. The boundary wall of the intermediate part 111 is thus made partly of cast epoxy resin and partly of paper. At the inner and outer ends of the oil path 105, parts 110 and 112 of the oil path have boundary walls made entirely of paper. At the inner end of the oil path 105, where the oil path opens into the port 99 in the metal rod 96, is a paper filter 106 in which is incorporated a metal mesh filter 107 constituting an electrical screen. A paper filter 108 is provided at the outer end of the oil path 105 and has, incorporated in the filter, a metal mesh filter 109, constituting an electrical screen.

FIG. 13 shows a fragmental cross-sectional view of an alternative form of oil path for use in the stop joint shown in FIG. 11 where, instead of providing a groove in the outer surface of the preformed body 121 of cast epoxy resin, a preformed member 127 and a preformed arcuate strip 126, each of fibrous insulating material, are laid along the outer surface of the body 121 before the insulating body 124 of helically lapped paper tapes is built up around the preformed body. The member 127 and strip 126 define a passage which will constitute the intermediate portion of the oil path 125 extending between the metal rod interconnecting the cable conductors and the space bounded by the joint enclosure.

It will be appreciated that in the oil filled electric cable stop joints described with reference to FIGS. 11 and 12 and FIG. 13, each oil path extending between the metal rod interconnecting the cable conductors and the space bounded by the joint enclosure is defined by a boundary wall of which a part, extending between the metal rod and said space, is of paper.

What I claim as my invention is:

1. A fluid-filled electric cable joint in which the jointed cable conductors are housed in a joint enclosure, in which the dielectric of each cable conductor connected at the joint includes a dielectric fluid which is free to flow along the cable conductor and the insulation of each cable conductor at the joint is a laminated body of helically lapped tapes of insulating material, and in which at least one path is provided for free flow of the dielectric fluid from each cable conductor into the shape bounded by the joint enclosure or vice versa, wherein each said path is defined by a boundary wall of which at least a part, extending between the cable conductor and said space, is of a fibrous insulating material, and filtering means provided at at least one end of each said path, for filtering from the flowing dielectric fluid particles of metal and other undesirable materials that may be carried by the fluid, said filtering means comprising, in combination, electrically insulating filtering material and a fine metallic mesh, serving as an electrical screen.

2. A fluid-filled electric cable joint as claimed in claim 1, wherein the filtering means at at least one end of each said path is a paper filter in which is incorporated a fine metallic mesh.

3. A fluid-filled electric cable joint as claimed in claim 1, comprising a stop joint in which the barrier to flow of dielectric fluid comprises an elongate metal member, by which the conductors of the two cables of the joint are both electrically and mechanically connected, and a preformed body of insulating material which surrounds at least part of and is sealed to the elongate metal member and to the joint enclosure, wherein the bodies of fibrous insulating material are provided at opposite ends of the preformed body and, at each end of the preformed body, the path for free flow of dielectric fluid between the cable conductor and the space bounded by the joint enclosure, over at least a part of the length of the path, is formed between the body of fibrous insulating material and the preformed body.

4. A fluid-filled electric cable joint as claimed in claim 3, wherein the surface of the preformed body against which the body of fibrous insulating material abuts has a groove cut in the surface to form said path.

5. A fluid-filled electric cable joint as claimed in claim 3, in which each body of fibrous insulating material is preformed, wherein the surface of each body of fibrous insulating material against which the preformed body abuts has a groove cut in the surface to form said path.

6. A fluid-filled electric cable joint as claimed in claim 3, wherein a preformed spacer is positioned between the preformed body and each body of fibrous insulating material as the body of fibrous insulating material is built up over the preformed body and spacer to form said path.

7. A fluid-filled electric cable joint as claimed in claim 3, wherein the end of the path opening into the space bounded by the joint enclosure is in a low or zero electrical stress area of the joint.

8. A fluid-filled electric cable joint as claimed in claim 1, in which an elongate metal member interconnects the cable conductors and a preformed body of insulating material surrounds at least part of and is sealed to the elongate metal member and to the joint enclosure, wherein each said path, over at least a part of its length, is formed between the preformed body and a body of fibrous insulating material positioned around the conductor joint.

9. A fluid-filled electric cable joint in which the jointed cable conductors are housed in a joint enclosure, in which the dielectric of each cable conductor connected at the joint includes a dielectric fluid which is free to flow along the cable conductor and the insulation of each cable conductor at the joint is a laminated body of helically lapped tapes of insulating material, and in which at least one path is provided for free flow of the dielectric fluid from each cable conductor into the space bounded by the joint enclosure or vice versa, wherein each said path is defined by a boundary wall which extends between the cable conductor and said space and which is made substantially wholly of a fibrous insulating material, and filtering means provided at at least one end of each said path, for filtering from the flowing dielectric fluid particles of metal and other undesirable materials that may be carried by the fluid, said filtering means comprising, in combination, electrically insulating filtering material and a fine metallic mesh, serving as an electrical screen.

10. A fluid-filled electric cable joint as claimed in claim 9, comprising a stop joint in which the barrier to flow of dielectric fluid comprises an elongate metal member, by which the conductors of the two cables of the joint are both electrically and mechanically connected, and a preformed body of insulating material which surrounds at least part of and is sealed to the elongate metal member and to the joint enclosure, wherein bodies of fibrous insulating material are provided at opposite ends of the preformed body, at each end of the preformed body, the path for free flow of dielectric fluid between the cable conductor and the space bounded by the joint enclosure, extends through the body of fibrous insulating material.

11. A fluid-filled electric cable joint as claimed in claim 10, wherein each path is a passage formed in one of the bodies of fibrous insulating material as the body is built up of lappings of tapes of said fibrous insulating material.

12. A fluid-filled electric cable joint as claimed in claim 11, wherein, over at least a part of the length of the passage, the passage follows a zig-zag course through the body of fibrous insulating material.

13. A fluid-filled electric cable joint as claimed in claim 10, wherein the path in each body of fibrous insulating material is a portion of the body which extends throughout the radial thickness of the body and which is arranged to be of a low hydraulic impedance.

14. A fluid-filled electric cable joint as claimed in claim 13, wherein said portion of the body of fibrous insulating material comprises layers of helically lapped tapes of fibrous insulating material, said layers having gaps between adjacent turns and adjacent layers being of opposite hand.

15. A fluid-filled electric cable joint as claimed in claim 13, wherein said portion of the body of fibrous insulating material is of a fibrous insulating material of higher porosity than the material of the remainder of the body.

16. A fluid-filled electric cable joint as claimed in claim 10, wherein the whole of each body of fibrous insulating material is of a fibrous insulating material of substantially higher porosity than the insulating material of the conductor insulation so that the body itself has a low hydraulic impedance.

17. A fluid-filled electric cable joint as claimed in claim 16, wherein the body of fibrous insulating material comprises layers of helically lapped tapes of fibrous insulating material, said layers having gaps between adjacent turns and adjacent layers being of opposite hand.

18. A fluid-filled electric cable joint as claimed in claim 9, wherein each said path extends through a body of fibrous insulating material positioned around the conductor joint.

19. A fluid-filled electric cable termination in which the terminated cable conductor is housed in a termination enclosure, in which the dielectric of the cable conductor terminated at the termination includes a dielectric fluid which is free to flow along the cable conductor and the insulation of the cable conductor at the termination is a laminated body of helically lapped tapes of insulating material, and in which at least one path is provided for free flow of the dielectric fluid from the cable conductor into the space bounded by the termination enclosure or vice versa, wherein the said path is defined by a boundary wall of which at least a part, extending between the cable conductor and said space, is of a fibrous insulating material, and filtering means provided at at least one end of each said path, for filtering from the flowing dielectric fluid particles of metal and other undesirable materials that may be carried by the fluid, said filtering means comprising, in combination, electrically insulating filtering material and a fine metallic mesh, serving as an electrical screen.

* * * * *